US011113742B2

(12) United States Patent
Malviya et al.

(10) Patent No.: US 11,113,742 B2
(45) Date of Patent: *Sep. 7, 2021

(54) CAPTURING AND EXTRACTING FRAGMENTED DATA AND DATA PROCESSING USING MACHINE LEARNING

(71) Applicant: Bank of America Corporation, Charlotte, NC (US)

(72) Inventors: Yugal Malviya, Hyderabad (IN); Vignesh Chandrasekaran, Bordentown, NJ (US); Anupreet K. Lamba, Haryana (IN); Amit Mishra, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 74 days.

This patent is subject to a terminal disclaimer.

(21) Appl. No.: 16/575,644

(22) Filed: Sep. 19, 2019

(65) Prior Publication Data

US 2020/0027150 A1    Jan. 23, 2020

Related U.S. Application Data

(63) Continuation of application No. 15/407,929, filed on Jan. 17, 2017, now Pat. No. 10,460,374.

(51) Int. Cl.
*G06Q 30/06* (2012.01)
*G06N 20/00* (2019.01)
(Continued)

(52) U.S. Cl.
CPC ..... *G06Q 30/0631* (2013.01); *G06F 16/2457* (2019.01); *G06F 16/252* (2019.01);
(Continued)

(58) Field of Classification Search
CPC ...... G06Q 30/0631; G06N 20/10; G06N 3/08; G06F 16/2457; G06F 16/252
(Continued)

(56) References Cited

U.S. PATENT DOCUMENTS

| 5,237,157 | A | * | 8/1993 | Kaplan | ................. | G06Q 30/02 235/375 |
| 8,060,502 | B2 | | 11/2011 | Churl et al. | | |

(Continued)

FOREIGN PATENT DOCUMENTS

WO    2004092980 A1    10/2004

OTHER PUBLICATIONS

"Introduction to Support Vector Machines," OpenCV 2.4.13.2 documentation; Accessed Dec. 22, 2016; http://docs.opencv.org/2.4/doc/tutorials/ml/introduction_to_svm/introduction_to_svm.html.

*Primary Examiner* — Yogesh C Garg
(74) *Attorney, Agent, or Firm* — Banner & Witcott, Ltd.; Michael A. Springs

(57) ABSTRACT

One or more aspects of the disclosure generally relate to computing devices, computing systems, and computer software that may be used for capturing and extracting fragmented data and for data processing using machine learning. Some aspects disclosed herein are directed to, for example, a system and method comprising generating a display for receiving fragmented data associated with a user. The method may comprise sending, to a user device associated with the user, the display for receiving fragmented data. A computing device may receive, from the user device and via the display for receiving fragmented data, first fragmented data associated with the user. The computing device may extract a plurality of data entries from the first fragmented data. A request for data associated with a first data entry of the plurality of data entries may be sent to the user device. The computing device may determine a data category for (Continued)

each data entry of the plurality of data entries. Based on the determined data category for each data entry of the plurality of data entries, the method may comprise determining one or more of a number of entries in each data category or an amount associated with each data category.

18 Claims, 8 Drawing Sheets

(51) Int. Cl.
| | |
|---|---|
| *G06F 16/25* | (2019.01) |
| *G06F 16/2457* | (2019.01) |
| *H04L 29/08* | (2006.01) |
| *H04L 29/06* | (2006.01) |
| *G06N 3/08* | (2006.01) |
| *G06N 20/10* | (2019.01) |
| *G06F 40/44* | (2020.01) |
| *G06F 40/45* | (2020.01) |
| *G06F 40/55* | (2020.01) |

(52) U.S. Cl.
CPC ............ *G06F 40/44* (2020.01); *G06F 40/45* (2020.01); *G06F 40/55* (2020.01); *G06N 3/08* (2013.01); *G06N 20/00* (2019.01); *G06N 20/10* (2019.01); *H04L 65/601* (2013.01); *H04L 67/10* (2013.01); *H04L 67/32* (2013.01)

(58) Field of Classification Search
CPC .......... G06F 40/45; G06F 40/55; G06F 40/44; H04L 65/601; H04L 67/10
USPC ........................................................ 705/26.7
See application file for complete search history.

(56) References Cited

U.S. PATENT DOCUMENTS

| | | | |
|---|---|---|---|
| 8,260,645 | B2 | 9/2012 | Banerjee et al. |
| 8,606,708 | B1 | 12/2013 | Homier et al. |
| 9,047,363 | B2 | 6/2015 | Palakodety et al. |
| 9,747,645 | B2 | 8/2017 | Fox et al. |
| 2003/0177010 | A1* | 9/2003 | Locke .................... G10L 13/00 704/260 |
| 2010/0020718 | A1* | 1/2010 | Tabbara .................. H04L 47/70 370/254 |
| 2017/0055016 | A1 | 2/2017 | Thomas et al. |
| 2018/0095933 | A1 | 4/2018 | Maruhashi |

* cited by examiner

600

Select the data type and upload data

Data Type: | Data Type 1 ▽ | — 605

Upload: | Choose file | No file chosen
— 610

[ Upload ]  [ Cancel ]

Select the data type and upload data

Data Type: | Data Type 1 ▽
(Select Data Type)
Data Type 1
Upload: Data Type 2
Data Type 3
Data Type 4
[ Upload ]  Cancel

FIG. 6B

| Date | Description | Amount |
|---|---|---|
| 8/19/2015 | <Description of entry 1> | |
| 12/15/2015 | <Description of entry 2> | 2000 |
| 12/15/2015 | <Description of entry 3> | 2000 |
| 12/22/2015 | <Description of entry 4> | -622.7 |
| 12/22/2015 | <Description of entry 5> | -280 |
| 12/22/2015 | <Description of entry 6> | -280 |
| 12/22/2015 | <Description of entry 7> | -110 |
| 12/22/2015 | <Description of entry 8> | -110 |
| 12/22/2015 | <Description of entry 9> | -100 |

FIG. 7

CAPTURING AND EXTRACTING FRAGMENTED DATA AND DATA PROCESSING USING MACHINE LEARNING

CROSS REFERENCE TO RELATED APPLICATIONS

This application is a continuation of and claims priority to U.S. application Ser. No. 15/407,929 filed Jan. 17, 2017, and entitled "Capturing and Extracting Fragmented Data and Data Processing Using Machine Learning," which is incorporated herein by reference in its entirety.

TECHNICAL FIELD

One or more aspects of the disclosure generally relate to computing devices, computing systems, and computer software. In particular, one or more aspects of the disclosure generally relate to computing devices, computing systems, and computer software that may be used for capturing and extracting fragmented data and for data processing using machine learning.

BACKGROUND

A user may have data stored with (or accessible via) many different entities or storage locations. This may result in fragmented data. As a result, one or more of those entities might not have a deep view of the user's data or requirements associated with the data.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects described herein are directed to, for example, a system and method comprising generating a display for receiving fragmented data associated with a user. The method may comprise sending, to a user device associated with the user, the display for receiving fragmented data. A computing device may receive, from the user device and via the display for receiving fragmented data, first fragmented data associated with the user. The computing device may extract a plurality of data entries from the first fragmented data. A request for data associated with a first data entry of the plurality of data entries may be sent to the user device. The computing device may determine a data category for each data entry of the plurality of data entries. Based on the determined data category for each data entry of the plurality of data entries, the method may comprise determining one or more of a number of entries in each data category or an amount associated with each data category.

In some aspects, receiving the first fragmented data may comprise receiving the first fragmented data and a user selection of a data type for the first fragmented data. The first fragmented data may comprise a statement associated with a user account of the user. Additionally or alternatively, the first fragmented data may comprise data indicative of a plurality of transactions associated with the user. Extracting the plurality of data entries may comprise extracting each of the plurality of transactions associated with the user. Extracting each of the plurality of transactions may comprise extracting, for each transaction of the plurality of transactions, a transaction amount and a transaction date corresponding to the transaction.

In some aspects, sending the request for data associated with the first data entry may be performed in response to a determination that the first data entry is missing one or more of a transaction amount associated with the first data entry, a transaction date associated with the first data entry, or a transaction description associated with the first data entry. Determining the data category for each data entry may be performed using a support vector machine algorithm. In some aspects, based on the one or more of the number of entries in each data category or the amount associated with each data category, the computing device may generate a recommendation for a product or service and send, to the user device, the recommendation for the product or service.

BRIEF DESCRIPTION OF THE DRAWINGS

The present disclosure is illustrated by way of example and not limited in the accompanying figures in which like reference numerals indicate similar elements and in which:

FIGS. 6A-B illustrates example user interfaces for capturing and extracting fragmented data and for data processing using machine learning in which various aspects of the disclosure may be implemented.

FIG. 7 illustrates an example of extracted data in which various aspects of the disclosure may be implemented.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
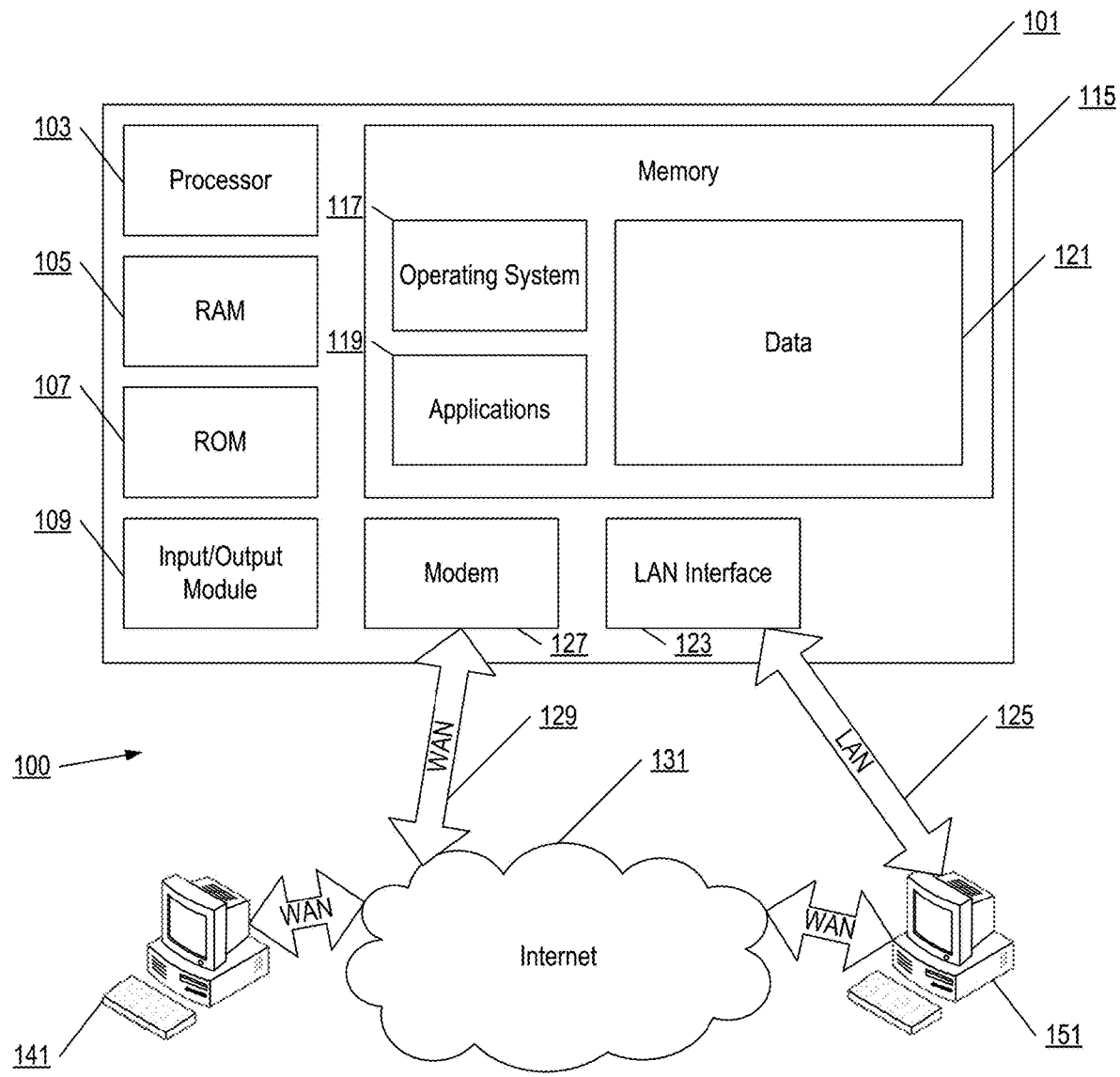
FIG. 1 illustrates an example operating environment in which various aspects of the disclosure may be implemented.

FIG. 1 illustrates an example block diagram of a computing device 101 (e.g., a computer server, desktop computer, laptop computer, tablet computer, other mobile devices, and the like) in an example computing environment 100 that may be used according to one or more illustrative embodiments of the disclosure. The computing device 101 may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Additionally or alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include any or all of the elements described above with respect to the computing device 101. The network connections depicted in FIG. 1 include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile terminals (e.g., mobile phones, smartphones, PDAs, notebooks, tablets, and the like) including various other components, such as a battery, speaker, and antennas (not shown).

Figure 2:
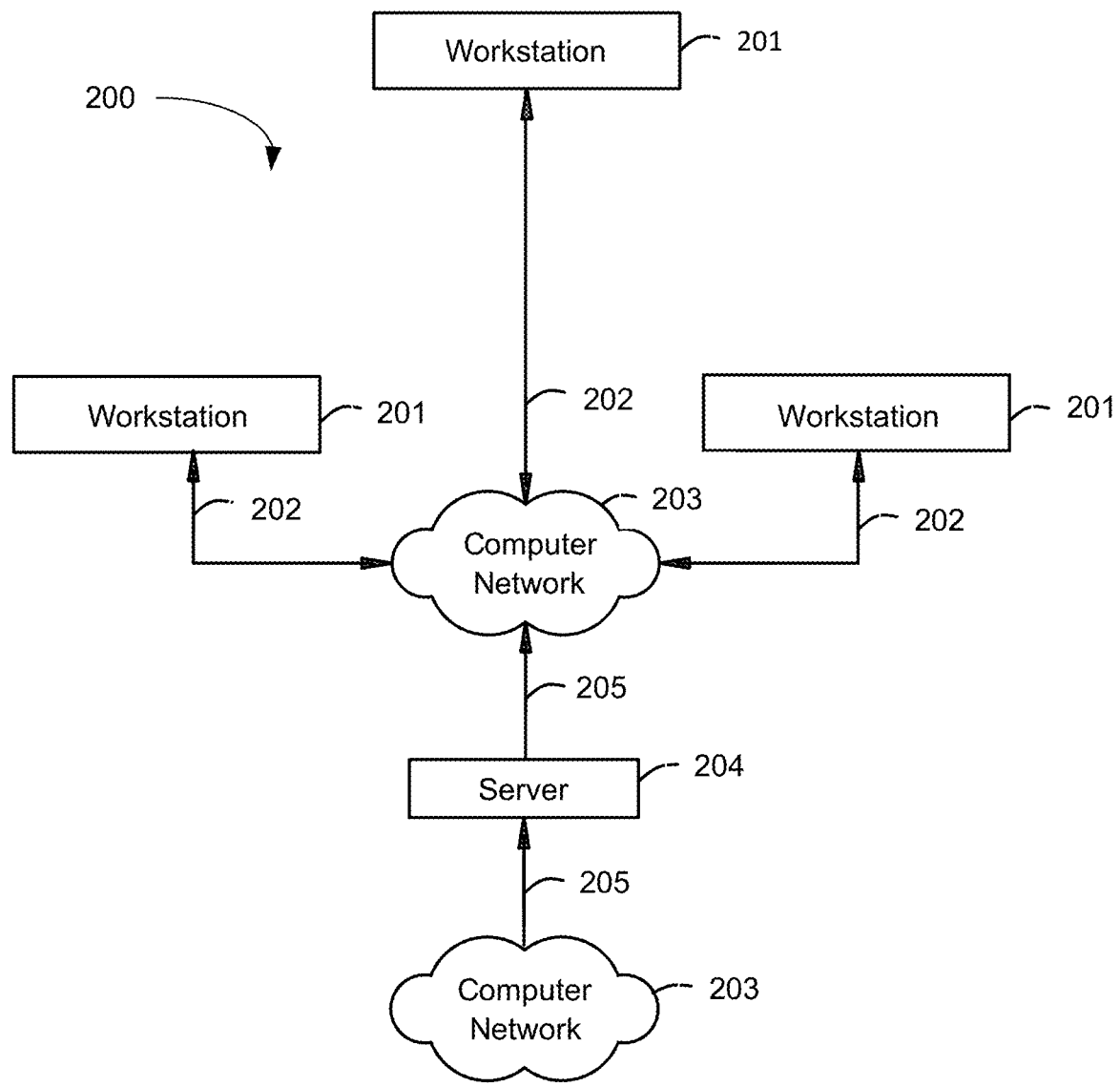
FIG. 2 illustrates another example operating environment in which various aspects of the disclosure may be implemented.

FIG. 2 illustrates another example operating environment in which various aspects of the disclosure may be implemented. An illustrative system 200 for implementing methods according to the present disclosure is shown. As illustrated, system 200 may include one or more workstations 201. The workstations 201 may be used by, for example, agents or other employees of an institution (e.g., a financial institution) and/or customers of the institution. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

Figure 3:
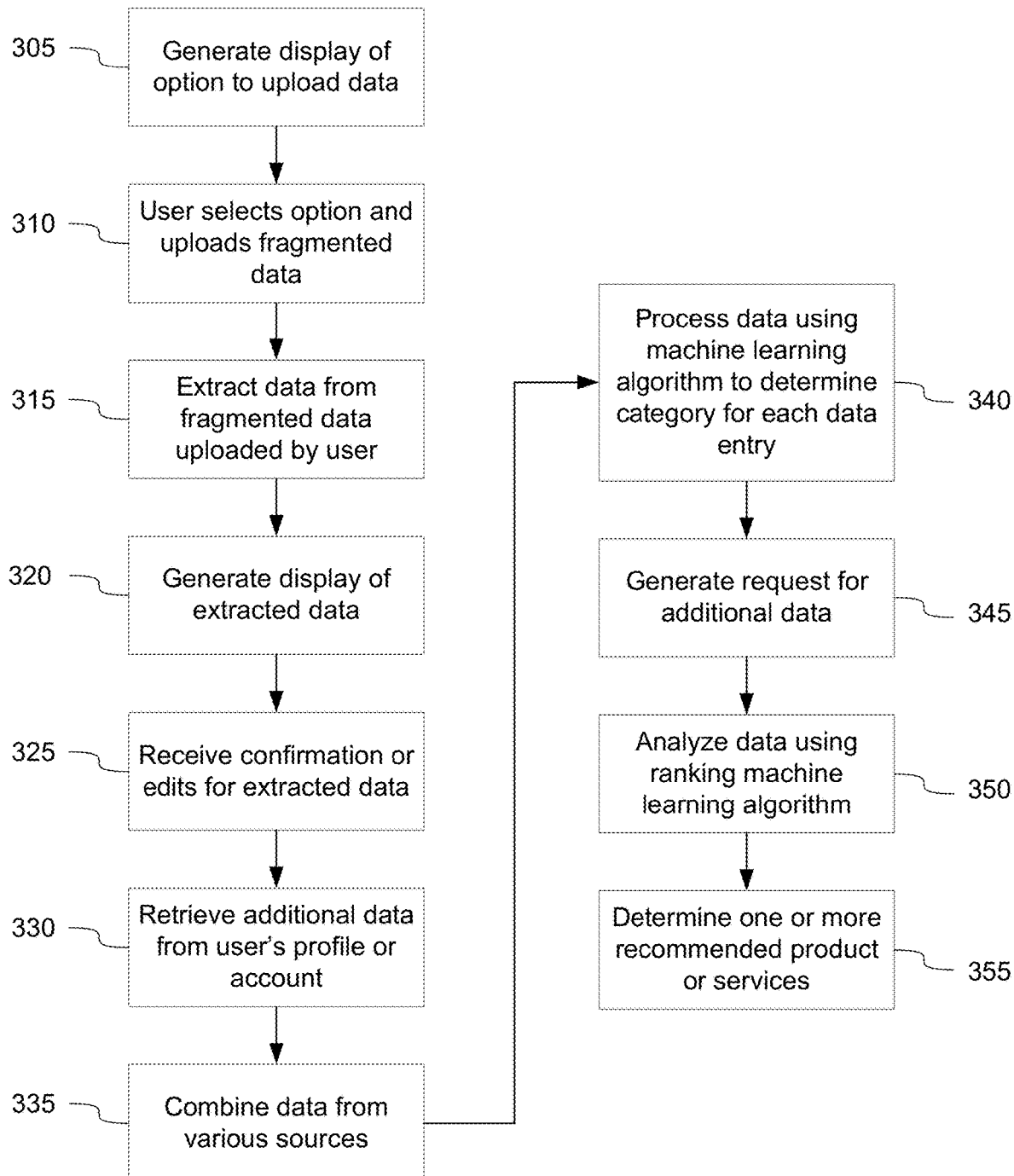
FIG. 3 illustrates an example method for capturing and extracting fragmented data and for data processing using machine learning in which various aspects of the disclosure may be implemented.

FIG. 3 illustrates an example method for capturing and extracting fragmented data and for data processing using machine learning in which various aspects of the disclosure may be implemented. One or more of the steps illustrated in FIG. 3 may be performed by a computing device as described herein.

In step 305, the computing device may generate a display of an option for the user to upload data. The option for the user to upload data may be displayed on a display device associated with the user, such as the user's laptop, tablet, smartphone, virtual reality display device, and the like. The data may comprise fragmented data that the computing device may process to generate one or more recommendations. For example, the data may include one or more statements (e.g., financial institution statements, such as credit card statements, savings account statements, checking account statements, and the like). Each of the statements may include data indicative of transactions of the user associated with a particular account. In addition to uploading the data, the user may upload an indication of (e.g., a descriptor for) the type of data uploaded, such as the account type for a statement (e.g., credit card account, savings account, checking account, and the like).

Figure 5:
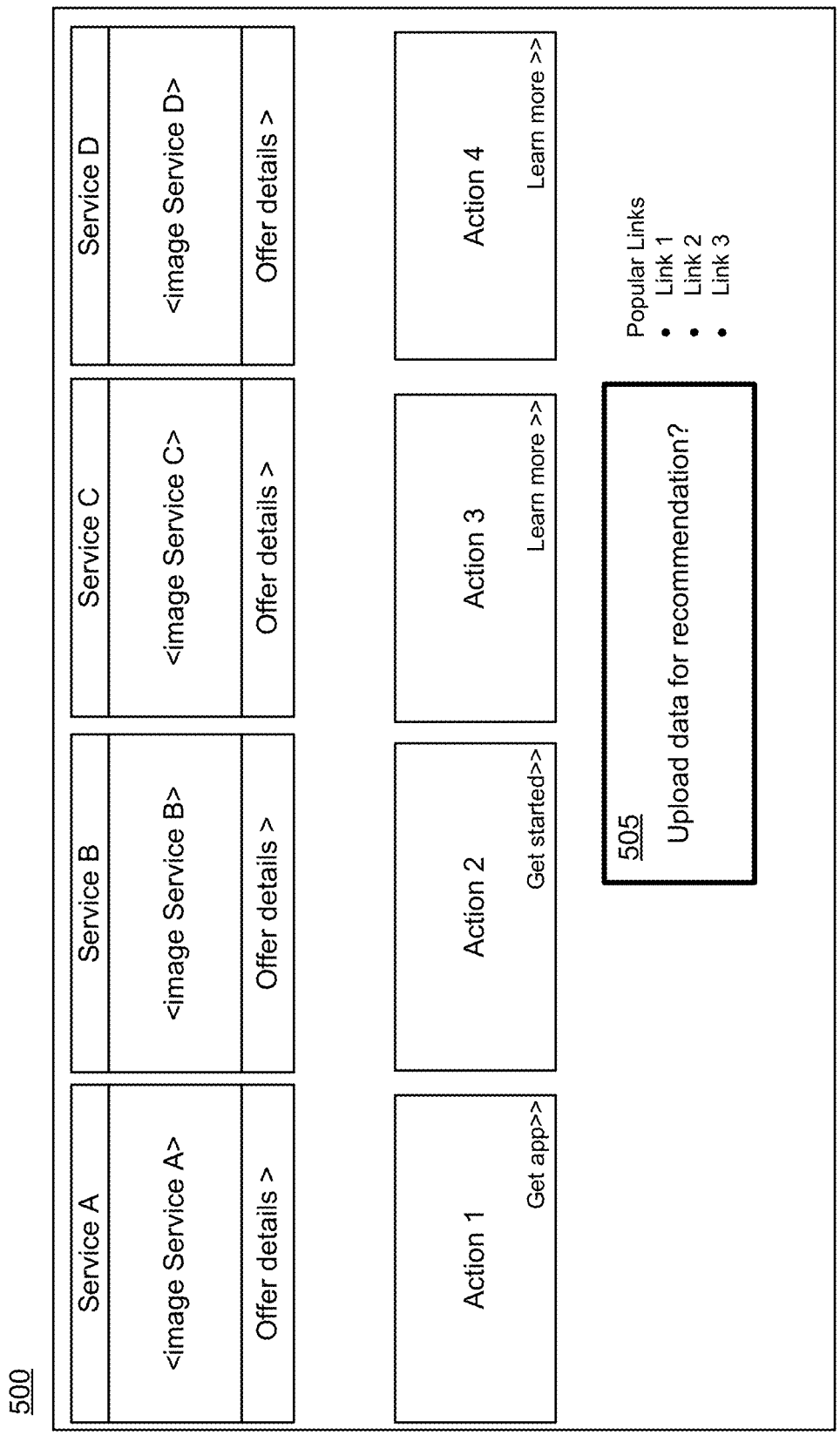
FIG. 5 illustrates an example user interface for capturing and extracting fragmented data and for data processing using machine learning in which various aspects of the disclosure may be implemented.

FIG. 5 illustrates an example user interface 500 for capturing and extracting fragmented data and for data processing using machine learning in which various aspects of the disclosure may be implemented. As previously described, the user interface 500 may be displayed on an output device associated with the user, such as the user's smartphone, laptop, or the like. The user interface 500 may include an option 505 for the user to upload data (e.g., fragmented data) to be processed by a computing device and for the computing device to generate one or more recommendations for the user.

Returning to FIG. 3, in step 310, the user may select the option (e.g., option 505 illustrated in FIG. 5) to upload data, and may upload fragmented data for processing. In response to a selection of the option to upload data, the computing device may cause one or more additional displays to be generated for receiving data from the user. The computing device may send the additional displays to a user device for display on a display device. The system may provide the user with the ability to upload data, such as transaction statement(s), in a secured environment.

FIGS. 6A-B illustrates example user interfaces 600 and 650 for capturing and extracting fragmented data and for data processing using machine learning in which various aspects of the disclosure may be implemented. The user interfaces 600 and 650 may provide the user with the ability to choose data to upload and to indicate the data type of the uploaded data. With reference to FIG. 6A, the user may select a data type from, for example, a dropdown menu 605 comprising a plurality of options for the data type (e.g., data type 1, data type 2, data type 3, data type 4, and the like, as illustrated in FIG. 6B). The user may also select 610 data, which may comprise fragmented data, to upload. As previously described, the data may comprise one or more statements, such as financial institution statements. The user may select the upload option 615 to upload the chosen data and the corresponding data type. In some aspects, the user device used to receive the fragmented data may secure (e.g., encrypt) the data and send the data to the computing device.

Returning to FIG. 3, in step 315, the computing device may extract data from the fragmented data uploaded by the user. For example, the transaction data may be extracted from the statement(s) uploaded by user in step 310. In some aspects, the fragmented data may include certain types of data that the computing device may use to generate one or more recommendations for the user. For example, a financial institution statement may include a plurality of transactions (e.g., credit card transaction, debit card transaction, account withdrawal or deposit, and the like) and information associated with the plurality of transactions (e.g., transaction amount, transaction date, transaction status, and the like). The computing device may identify the data to extract and/or the data type of the data to extract based on metadata present in the fragmented data (e.g., data describing the transaction(s) on the statement, such as an identifier of the data type), optical character recognition of the text of the fragmented data, corresponding the fragmented data with a template for the type of the fragmented data, and the like. The computing device may extract the data from a plurality of fragmented data uploaded by the user, such as a plurality of statements.

In step 320, the computing device may generate a display of the extracted data. In particular, after the computing device extracts the relevant data from the fragmented data and/or combines extracted data from several different files uploaded by the user, the computing device may combine and order the data. For example, extracted data may be presented to the user, via the user device, in tabular form for the user to confirm or edit.

FIG. 7 illustrates an example of extracted data 700 in which various aspects of the disclosure may be implemented. The extracted data 700 may include a plurality of entries, and each entry may include a date 705 of the transaction, a description 710 of the transaction, and/or an amount 715 of the transaction. As previously explained, the computing device may identify each entry based on metadata, optical character recognition, comparison to a template, and the like. The computing device may generate a display of the entries in tabular form, and the user may confirm or edit the extracted data.

Returning to FIG. 3, in step 325, the computing device may receive, from the user, confirmation or edits for the extracted data. For example, the user may edit or remove the transactions displayed to the user. The user may edit an entire row or may edit each entry of the row (e.g., edit the date, amount, and/or description). The user may also add transactions, including the date, description, and/or amount of the added transaction. The user may make the additions, edits, and/or removals via an input device of a user device. The additions, edits, and/or removals may be displayed to the user for confirmation. The user device may send the edits to the computing device.

In step 330, the computing device may retrieve additional data from the user's profile or account, which may also comprise fragmented data. For example, the computing device may retrieve the user's profile with the entity and various details from the profile. The additional data may include, for example, additional transaction data (e.g., date, time, and/or amount) performed by the user via the entity. The additional data may include information describing the user, such as the user's full legal name, social security number, email address, physical address, phone number, and the like. The computing device may retrieve the account data without prompting the user for the information.

In step 335, the computing device may combine data from various sources. For example, the computing device may combine the fragmented data from the various sources (e.g., statements uploaded by the user in step 310, edits from the user in step 325, and/or data from the user's profile or account in step 330). In some aspects, the computing device may combine transaction data, including transaction date, transaction time, and/or transaction amount, from the plurality of data sources.

In step 340, the computing device may use a machine learning algorithm to determine one or more category for each data entry. For example, transaction data may be categorized by the computing system using a machine learning algorithm. That is, a computing device may process the transaction data to categorize each transaction using, for example, a Support Vector Machine (SVM) or a similar machine learning algorithm. Exemplary transaction categories may include, for example, an online transfer, a direct deposit, a visit to an ATM, a credit card transaction, a card transaction at a restaurant, a card transaction with an airline, an airline ticket purchase, a travel purchase, a grocery store purchase, bill payments, luxury and/or entertainment purchases, or any other transaction category.

Figure 8:
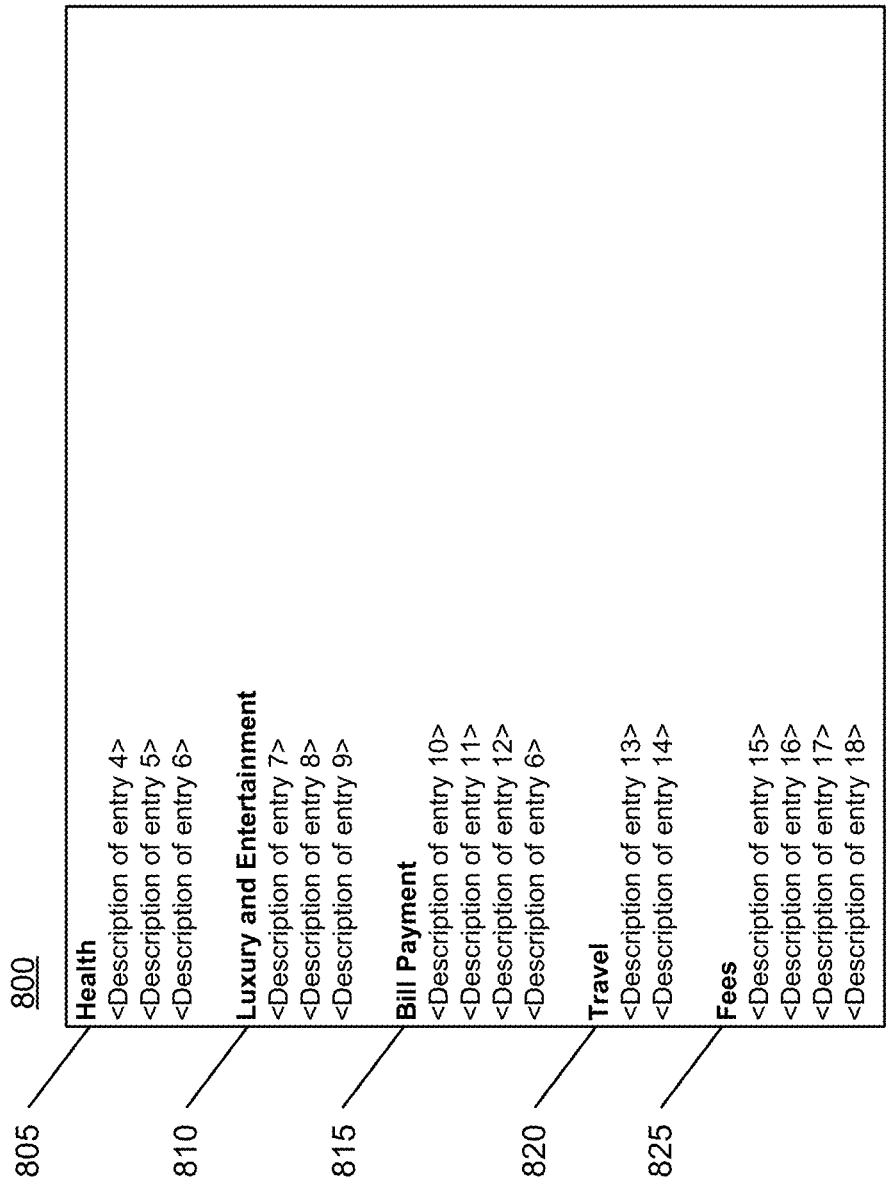
FIG. 8 illustrates an example of categorized data in which various aspects of the disclosure may be implemented.

FIG. 8 illustrates an example 800 of categorized data in which various aspects of the disclosure may be implemented. For example, the computing device, via the support vector machine algorithm, may determine a plurality of categories, such as a health category 805, a luxury and entertainment category 810, a bill payment category 815, a travel category 820, and a fees category 825. The computing device may insert each transaction from the various data sources (or data descriptive thereof) under one or more of the determined categories. For example, the computing device may insert transactions 4, 5, and 6 under the health category 805, transactions 7, 8, and 9 under the luxury and entertainment category 810, transactions 10, 11, 12, and 6 under the bill payment category 815, and so on.

In some aspects, the computing device may determine the number of transactions in each of the categories, the amount spent for each of the categories (or an average thereof), and other trends for the user. For example, the computing device may determine, based on the categorized data, how often the user visits an ATM for cash withdrawals. The computing device may determine, based on the categorized data, how many visits the user makes to a financial center and/or the user's top reasons for visiting the financial center (e.g., withdrawal, deposit, change to account information, and the like). The computing device may determine, based on the categorized data, the frequency of the user writing checks. The computing device may determine, based on the categorized data, that the user has an average monthly balance of $10K for the last 3 months. The computing device may attempt to determine, based on the categorized data, whether this is true for the last 12 months.

Returning to FIG. 3, in step 345, the computing device may generate a request for additional data from the user. The computing device may generate the request in response to a determination that one or more pieces of data are missing from the data combined from the various data sources. In some aspects, the computing device may present the user with relevant questions, via a graphical user interface, to capture missing information from one or more statement(s) and/or transaction(s). For example, if a transaction on a statement is missing metadata or cannot otherwise be identified (e.g., optical character recognition failed to identify a category for the transaction), the computing device may generate a request to the user for a description of the transaction, a category of the transaction (e.g., via a drop-down menu), an amount for the transaction, and/or a date of the transaction.

In step 350, the computing device may analyze the data using a ranking machine learning algorithm. For example, the computing device may apply a machine learning algorithm (e.g., a Ranking Support Vector Machine (RSVM) or similar machine learning algorithm) on the processed data received in one or more of the steps previously described. The machine learning algorithm may perform a financial transaction analysis on the previously captured and processed data. In some aspects, output of the analysis may provide answers to one or more of the following questions, which in turn may be used to determine one or more recommended product or service for the user. What type (e.g., category) of transactions are most frequent and how often do they occur? Which geographical region (e.g., place) does the user visit most frequently (and how often)? How much does the user spend on commonly occurring transactions? How much in money inflow and outflow does the user have each month? Is the user a frequent traveler? If so, which airlines? Is the user qualified for preferred rewards offers? Does a particular type of deal apply to the user transaction(s)?

In step 355, the computing device may determine one or more recommended products or services for the user, based at least in part on the analysis performed in step 350. For example, if the user exceeds a threshold number of transactions or amount of spending in a particular category (e.g., travel or groceries), the computing device may recommend a credit card or debit card that rewards spending in that category. If the user visits a particular location of a financial institution more than a threshold number of times, the computing device may recommend a different location that is closer to the user (e.g., home or work location). If the user visits a financial institution to deposit checks at least a threshold number of times, the computing device may generate a recommendation for the user to download an application to the user's device that can facilitate virtual check deposits.

As another example, the computing device may take an existing loan approval or agreement letter as input (e.g., in step 310), extract the existing loan metadata (e.g., loan amount, down payment, and the like, such as in step 315), compute the existing property value (e.g., in step 340), and/or ask the user for the outstanding balance (e.g., in step 345) if the balance information is not available or detectable in the loan data. The computing device may process the data (e.g., in step 350) and show loan offers (e.g., in step 355). The computing device may suggest offers on existing products of the user (e.g., in step 355). For example, the computing device may analyze a credit card statement and show a balance transfer offer to a different credit card.

Figure 4:
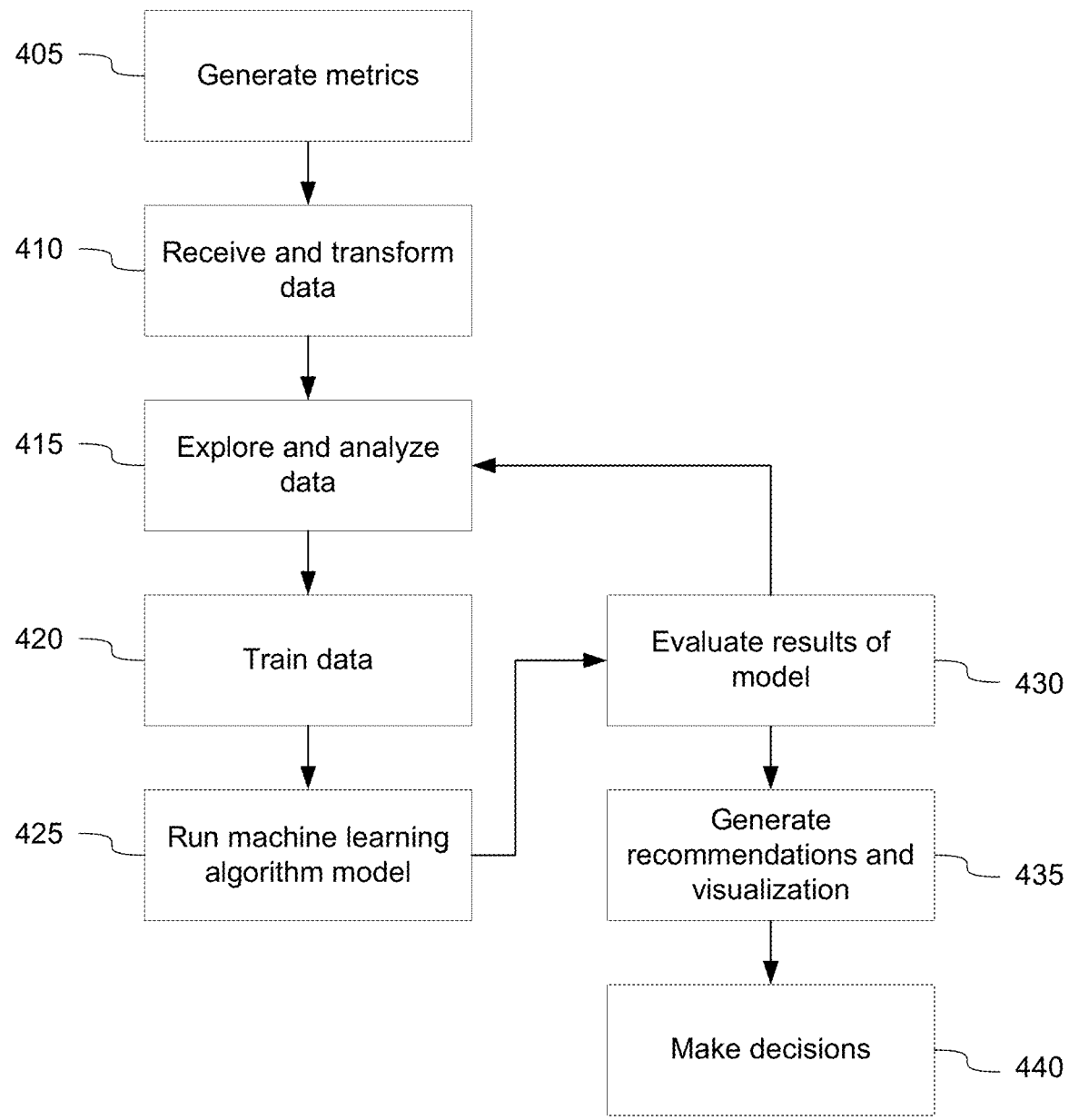
FIG. 4 illustrates at least a portion of an example method for capturing and extracting fragmented data and for data processing using machine learning in which various aspects of the disclosure may be implemented.

FIG. 4 illustrates at least a portion of an example method for capturing and extracting fragmented data and for data processing using machine learning in which various aspects of the disclosure may be implemented. One or more of the steps illustrated in FIG. 4 may be performed by a computing device as described herein. As previously explained, a classification model may be developed using a Support Vector Machine (SVM) algorithm to categorize data, such as transaction data. Exemplary categories may include, for example, fees, bill payments, check deposits, travel expenses, and the like. As also previously explained, a ranking model may be developed using a Ranking Support Vector Machine (RSVM) algorithm to rank the categorized transaction data according to preferences set.

In step 405, the computing device may generate one or more metrics to monitor. In step 410, the computing device may receive and/or transform data. The data may comprise, for example, sample transaction data. In step 415, the computing device may explore and analyze the data. For example, the computing device may remove some of the data before training the system using the data. In step 420, the computing device may train the data. In step 425, the computing device may run a machine learning algorithm model, such as a SVM algorithm or a RSVM algorithm. In step 430, the computing device may evaluate the results of the model. If the results are to be revised (e.g., fine-tuned), the computing device may return to step 415 to receive or analyze additional training data. In step 435, the computing device may generate one or more recommendations or visualizations. In step 440, the computing device may make decisions based on the recommendations or visualizations.

Various examples of the using the system and method described herein will now be provided. For a checking account, the computing device may receive and consider various data points during its analysis, including, for example, month end average minimum, monthly average credit amount, monthly average debit amount, direct deposit each month, average daily balance, and the like. If the computing device does not identify or find certain fees on the statement (or statement data), the computing device may prompt the user to answer certain questions related to fees, such as monthly maintenance fees, ATM Fees, bill pay fees, statement copy fees, check image service fees, check copy fees, ordering check fees, teller withdrawal fees, stop payment fees, cashier's checks fees, incoming wire transfer fees, outgoing wire transfer fees, deposited item returned fees, and the like.

The computing device may segregate and analyze the data determining one or more of the following items: what type of transactions are most frequent (and how frequent)? Which geographic location (e.g., place) does the user visit most frequently (and how often)? How much does the user spend on the frequently occurring transactions? Do certain deals apply to the transactions? Is the user a frequent traveler? If so, which airlines does the user use? Does the user qualify for preferred rewards offers? How much is the user's money inflow and outflow each month?

Based on the above analysis, the computing device may determine one or more suitable checking account for the user, and/or what features can be provided to or added for the user. The computing device may generate a display of the one or more suitable checking accounts and added features for display on a display device associated with the user. Added features may include, for example: the user would have kept an additional $3.95 for a period of 8 months if the checking account was linked with a savings account, the user may have saved ~$17 (10% of a $174 purchase (or multiple purchases) at XYZ restaurant) if the user opted for a particular type of deal, and/or projected benefits if the user opted for a preferred rewards program.

For a savings account, the computing device may receive and consider various data points during its analysis, including, for example, APY % (Annual Percentage Yield), minimum daily balance, month end average minimum, monthly average credit amount, monthly average debit amount, and the like. If the computing device does not identify or find certain fees on the statement, the computing device may prompt the user to answer certain questions related to fees, such as monthly maintenance fees, withdrawal limit fees, ATM fees, statement copy fees, teller withdrawal fees, stop payment fees, cashier's checks fees, incoming wire transfer fees, outgoing wire transfer fees, deposited item returned fees, and the like.

The computing device may segregate and analyze the data to determine one or more of the following items: how much is money inflow and outflow each month? How much minimum daily balance is the user maintaining? Does the user qualify for a money market account? Does the user qualify for preferred rewards offers?

Based on the above analysis, the computing device may determine one or more suitable savings accounts for the user, and/or what features can be provided to or added for the user. The computing device may generate a display of the one or more suitable savings accounts and added features for display on a display device associated with the user. Added features may include, for example, projected benefits if the user opted for a preferred rewards program, how much the user may save by linking a checking account and a saving account, and the like.

For credit cards, the computing system may receive and consider various data points during its analysis, including, for example, Annual Percentage Rate (APR) for purchases, APR for balance transfers, APR for cash advances, annual fee, cash back on groceries, gas and every purchase, bonus when the user redeems into a checking or savings account, transaction fees, purchases, balance transfers, cash advances, foreign transactions, returned payment fee, whether the user is frequent traveler (and if so, which airlines), and additional factors. The computing device may determine which credit card suits the user, including cash rewards, travel rewards, low interest rate, and the like.

The computing device may segregate and analyze the data to determine one or more of the following items: what type of transactions are most frequent (and how frequent)? Are there considerable transactions for charitable causes? Are there considerable transactions for sport purchases (e.g., baseball, and the like)? Which place does the user visit frequently (and how often)? How much does the user spend on frequently occurring transactions? Do certain deals apply to the transactions? Is the user a frequent traveler? If so, which airlines? Does the user qualify for preferred rewards offers? How much does the user spend monthly on groceries, gas, or other categories of spending?

Based on the above analysis, the computing device may determine one or more suitable credit card for the user, and/or what features can be provided to or added for the user. The computing device may generate a display of the one or more suitable credit cards and added features for display on a display device associated with the user. Added features may include, for example, the user may have saved ~$17 (10% of a $174 purchase (or multiple purchases) at XYZ restaurant) if the user opted for a particular type of deal, projected benefits if the user opted for a preferred rewards program (e.g., when the user enrolls in the preferred rewards program, the user can get a 25% or more rewards bonus on all eligible credit cards), security benefits with a credit card against potential unauthorized use, protection against going over limits (e.g., to help prevent declined purchases, returned checks, or other limits) when the user links an eligible checking account to the credit card.

In yet another example, products or services associated with a checking account may be recommended. A user of a first financial institution may have a fee of $5, an average daily balance of $6,200, a monthly average credit amount of $823, and a monthly average debit amount of $575. The user may frequently stay at a first brand of hotels. The computing device may recommend a first type of checking account which would result in waiving the fee if the user's average daily balance is above $1,500. The computing device may also recommend one or more features, such as a particular deal that would result in 10% off for stays at the first brand of hotel. The computing device may also recommend a program where the user would have added $3.95 for a period of 8 months if the checking account was linked to a savings account.

In a second example, products or services associated with a checking account may be recommended. A user of a second financial institution may have a fee of $12, an average daily balance of $27,000, a monthly average credit amount of $6,436, and a monthly average debit amount of $3,398. The statement data may indicate that the user travels via a specific airline every weekend (or almost every weekend), at a monthly average cost of $440. The statement data may indicate that the user frequently conducts transactions with a particular pet store, at a monthly average cost of $80. The statement data may indicate that the user frequently conducts transactions at a particular department store, at a monthly average cost of $100. The statement data may indicate that the user spends a monthly average of $150 on groceries, $100 on gas, and $300 on miscellaneous purchases.

The computing device may recommend a second type of checking account, such as an interest checking account with a particular preferred rewards program. A prerequisite of the interest checking account and preferred reward program may be an average monthly balance of $20,000, for which the user is eligible according to the statement data. Various benefits may also be provided to the user if the user signs up. Eligible credit cards may earn a 25% rewards bonus. For example, if the user has a cash back credit card and redeems $100 into a checking or savings account, the user's total cash back may increase to $125. As a preferred rewards client, the user may receive a 0.25% interest rate discount on a new auto purchase or a loan. The user may receive priority service through a preferred rewards center (e.g., a dedicated team of specialists available to handle product and service needs). The user may enjoy fee waivers on everyday services for personal checking and savings accounts, such as monthly maintenance fees waived on up to 4 eligible checking and 4 savings accounts, no fees for ATM or debit card replacement including rush replacement, standard check orders, cashier's checks, check image service, check copies, stop payments, and incoming domestic wire transfers, fees waived from linked savings accounts, secondary checking accounts, or from a home equity line of credit.

If the user opts for cash back deals, the user could have saved $8 (10%) from the $80 pet store purchase. The user could have also saved $10 (10%) from the $100 department store purchase. If the user opts for a particular travel credit card, the user may earn miles with a particular airline with no mileage cap. The user may earn up to 5 miles per $1 spent using the dining services of the airline. The user may earn 3 miles for every $1 spent on tickets with the airline, vacation packages, cargo, and in-flight purchases. The user may earn 1 mile for every $1 spent on all other purchases. The user may redeem miles for flights on the airline and at over a dozen other global airline partners. The user may be credited 30,000 bonus miles after the user makes $1,000 or more in purchases within the first 90 days. The user may receive a free checked bag for the user and up to six other passengers on the same reservation.

| Product or Feature | Savings |
| --- | --- |
| Preferred rewards program | $144 waived as monthly maintenance fee<br>~$60 waived as miscellaneous fees |
| Cash back deal | $96 cash back pet store purchases<br>$120 cash back department store purchases |
| Airline credit card | 15,840 miles earned using credit card for airline ticket purchase<br>6,600 miles earned using credit card for groceries, gas, and other miscellaneous purchases<br>30,000 miles bonus |
| Total savings (with no extra cost or change in activity) | $420 + 22,440 miles yearly<br>$35 + 1,870 miles monthly |

In a third example, products or services associated with a credit card may be recommended. A user of a third financial institution may have an average monthly statement amount of $1,000. The user may have monthly average groceries of $250, gas of $100, and miscellaneous purchases of $500. The computing device may recommend a credit card, such as a cash rewards credit card. Various benefits may exist if the user signs up. The user may receive 1% cash back on every purchase, 2% at grocery stores and wholesale clubs, and 3% on gas for the first $2,500 in combined grocery/wholesale club/gas purchases each quarter. The credit card may include a low introductory APR offer. The user may receive a 10% customer bonus each time the user redeems into a particular checking or savings account. If the user is a preferred rewards cash rewards client, the user may increase the bonus to 25% or more. There might not be an annual fee. The user may receive an online $100 cash rewards bonus after making at least $500 in purchases in the first 90 days of account opening.

| Product or Feature | Savings |
| --- | --- |
| Cash rewards credit card | $60 on each purchase (1% on each purchase)<br>$60 on groceries (2% on groceries)<br>$36 on gas (3% on gas)<br>$15 additional cash back (10% bonus each time user redeems)<br>Or<br>$39 additional cash back (25% bonus in case preferred rewards client)<br>$100 cash rewards bonus for $500 in purchases in the first 90 days |
| Total Savings | $171 per year ($14 per month) Or<br>$195 per year ($16 per month) if preferred rewards client<br>(Excluding $100 onetime bonus) |

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
   generating a display associated with a user, the display including an option to upload data;
   sending, to a user device associated with the user, the display including the option to upload data;
   receiving, by a computing device, from the user device, and via the display first fragmented data associated with the user, the first fragmented data including metadata indicating a data type for the first fragmented data;
   extracting, by the computing device, a plurality of data entries from the first fragmented data, the plurality of data entries being identified for extraction based on the metadata in the first fragmented data;
   sending, to the user device, a request for data associated with a first data entry of the plurality of data entries;
   determining, by the computing device and using machine learning, a data category for each data entry of the plurality of data entries; and
   based on the determined data category for each data entry of the plurality of data entries, determining one or more of a number of entries in each data category or an amount associated with each data category.

2. The method of claim 1, wherein the first fragmented data comprises a statement associated with a user account of the user.

3. The method of claim 1, wherein the first fragmented data comprises data indicative of a plurality of transactions associated with the user.

4. The method of claim 3, wherein the extracting the plurality of data entries comprises extracting each of the plurality of transactions associated with the user.

5. The method of claim 4, wherein the extracting each of the plurality of transactions comprises extracting, for each transaction of the plurality of transactions, a transaction amount and a transaction date corresponding to the transaction.

6. The method of claim 1, wherein the sending the request for data associated with the first data entry is performed in response to a determination that the first data entry is missing one or more of a transaction amount associated with the first data entry, a transaction date associated with the first data entry, or a transaction description associated with the first data entry.

7. The method of claim 1, wherein the determining the data category for each data entry is performed using a support vector machine algorithm.

8. The method of claim 1, further comprising:
   based on the one or more of the number of entries in each data category or the amount associated with each data category, generating, by the computing device, a recommendation for a product or service and sending, to the user device, the recommendation for the product or service.

9. An apparatus, comprising:
a processor; and
memory storing computer-executable instructions that, when executed by the processor, cause the apparatus to:
generate a display associated with a user, the display including an option to upload data;
send, to a user device associated with the user, the display including the option to upload data;
receive, from the user device and via the display, first fragmented data associated with the user, the first fragmented data including metadata indicating a data type for the first fragmented data;
extract a plurality of data entries from the first fragmented data, the plurality of data entries being identified for extraction based on the metadata in the first fragmented data;
send, to the user device, a request for data associated with a first data entry of the plurality of data entries;
determine, using machine learning, a data category for each data entry of the plurality of data entries; and
based on the determined data category for each data entry of the plurality of data entries, determine one or more of a number of entries in each data category or an amount associated with each data category.

10. The apparatus of claim 9, wherein the first fragmented data comprises a statement associated with a user account of the user.

11. The apparatus of claim 9, wherein the first fragmented data comprises data indicative of a plurality of transactions associated with the user.

12. The apparatus of claim 11, wherein the extracting the plurality of data entries comprises extracting each of the plurality of transactions associated with the user.

13. The apparatus of claim 12, wherein the extracting each of the plurality of transactions comprises extracting, for each transaction of the plurality of transactions, a transaction amount and a transaction date corresponding to the transaction.

14. The apparatus of claim 9, wherein the sending the request for data associated with the first data entry is performed in response to a determination that the first data entry is missing one or more of a transaction amount associated with the first data entry, a transaction date associated with the first data entry, or a transaction description associated with the first data entry.

15. The apparatus of claim 9, wherein the determining the data category for each data entry is performed using a support vector machine algorithm.

16. The apparatus of claim 9, wherein the memory stores additional computer-executable instructions that, when executed by the processor, cause the apparatus to:
based on the one or more of the number of entries in each data category or the amount associated with each data category, generate a recommendation for a product or service and sending, to the user device, the recommendation for the product or service.

17. One or more non-transitory computer-readable medium having instructions stored thereon that, when executed by one or more computing devices, cause the one or more computing devices to:
generate a display associated with a user, the display including an option to upload data;
send, to a user device associated with the user, the display including the option to upload data;
receive, from the user device and via the display, first fragmented data associated with the user, the first fragmented data including metadata indicating a data type for the first fragmented data;
extract a plurality of data entries from the first fragmented data, the plurality of data entries being identified for extraction based on the metadata in the first fragmented data;
send, to the user device, a request for data associated with a first data entry of the plurality of data entries;
determine, using machine learning, a data category for each data entry of the plurality of data entries; and
based on the determined data category for each data entry of the plurality of data entries, determine one or more of a number of entries in each data category or an amount associated with each data category.

18. The one or more non-transitory computer-readable medium of claim 17, wherein the sending the request for data associated with the first data entry is performed in response to a determination that the first data entry is missing one or more of a transaction amount associated with the first data entry, a transaction date associated with the first data entry, or a transaction description associated with the first data entry.

* * * * *